United States Patent [19]
Chen

[11] Patent Number: 5,821,732
[45] Date of Patent: Oct. 13, 1998

[54] CHARGER DEVICE

[75] Inventor: Stephen Chen, Chang Hua, Taiwan

[73] Assignee: E. Lead Electronic Co., Ltd, Chang Hua, Taiwan

[21] Appl. No.: 923,338

[22] Filed: Sep. 4, 1997

[51] Int. Cl.⁶ .................................................. H02J 7/00
[52] U.S. Cl. ........................................ 320/110; 320/107
[58] Field of Search .................................. 320/107, 110, 320/112–113

[56] References Cited

U.S. PATENT DOCUMENTS

| | | | |
|---|---|---|---|
| 4,636,703 | 1/1987 | Tohya et al. .............................. | 320/110 |
| 5,245,266 | 9/1993 | Yuen ....................................... | 320/110 |
| 5,256,954 | 10/1993 | Chen ....................................... | 320/110 |
| 5,287,052 | 2/1994 | Wang ....................................... | 320/110 |
| 5,357,185 | 10/1994 | Chen ....................................... | 320/110 |

*Primary Examiner*—Peter S. Wong
*Assistant Examiner*—K. Shin
*Attorney, Agent, or Firm*—Peterson, Wicks, Nemer & Kamrath; Alan D. Kamrath

[57] ABSTRACT

A charger device has a box and two charger jibs. The box has a slot, a channel recess, and a magnet device. Each charger jib has a button, a threaded rod disposed on a bottom of the button, and a probe support device connected to the button. The probe support device has an upper casing, a lower casing coupled with the upper casing, a probe bar disposed between the upper casing and the lower casing, an adjusting seat clamping the upper casing and the lower casing, a nut disposed on a bottom of the adjusting seat, a magnet disk disposed on a bottom of the nut, and the threaded rod passing through the slot, the adjusting seat, and the nut.

5 Claims, 7 Drawing Sheets

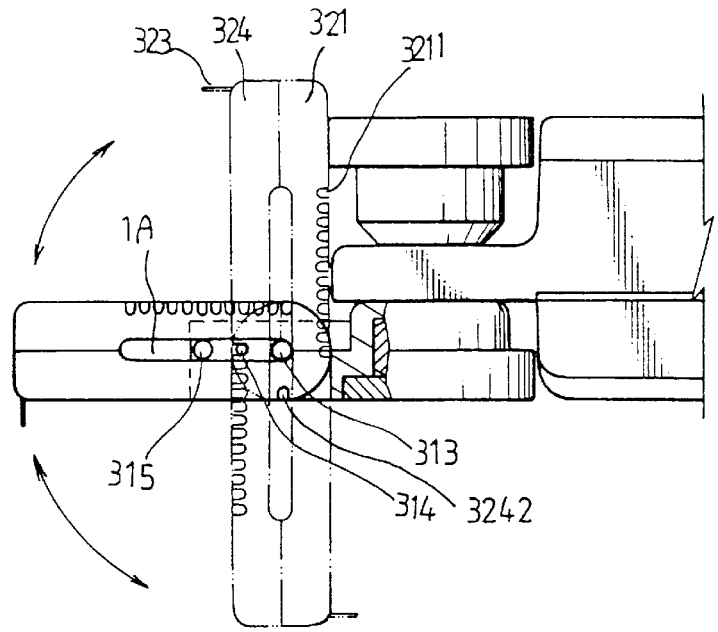
F I G. 5
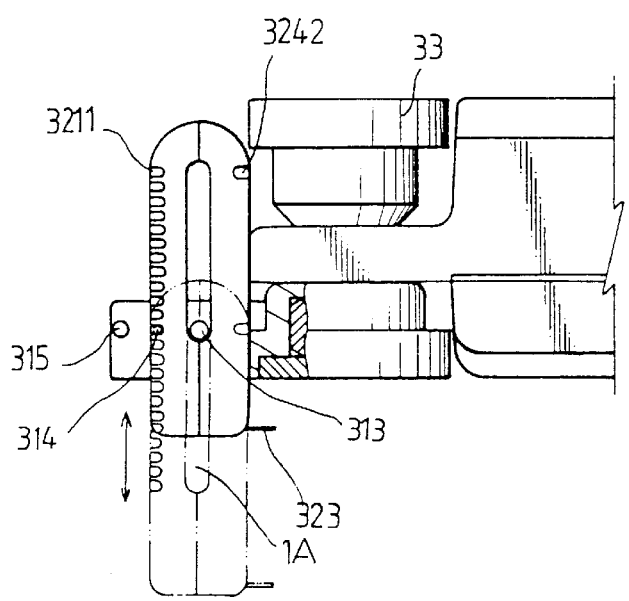
F I G. 6

CHARGER DEVICE

BACKGROUND OF THE INVENTION

The present invention relates to a charger device. More particularly, the present invention relates to a charger device for charging various batteries.

A conventional charger device is suitable for one kind of battery. Since the sizes of various batteries are different, a large number of conventional charger devices are necessary for charging various batteries.

SUMMARY OF THE INVENTION

An object of the present invention is to provide a charger device for charging various batteries.

Accordingly, a charger device comprises a box and two charger jibs. The box has a slot formed on a front portion of the box, a channel recess formed on a bottom of the box, and a magnet device disposed on the bottom of the box. Each charger jib has a button, a threaded rod disposed on a bottom of the button, and a probe support device connected to the button. The probe support device has an upper casing, a lower casing coupled with the upper casing, a probe bar disposed between the upper casing and the lower casing, an adjusting seat having a round hole, and two arms clamping the upper casing and the lower casing, a nut disposed on a bottom of the adjusting seat, a magnet disk disposed on a bottom of the nut, and the threaded rod passing through the slot, the round hole, and the nut.

BRIEF DESCRIPTION OF THE DRAWINGS

FIG. 5 is a second schematic view illustrating an operation of a charger device of a preferred embodiment in accordance with the present invention;

FIG. 6 is a third schematic view illustrating an operation of a charger device of a preferred embodiment in accordance with the present invention;

DETAILED DESCRIPTION OF THE INVENTION

Figure 1:
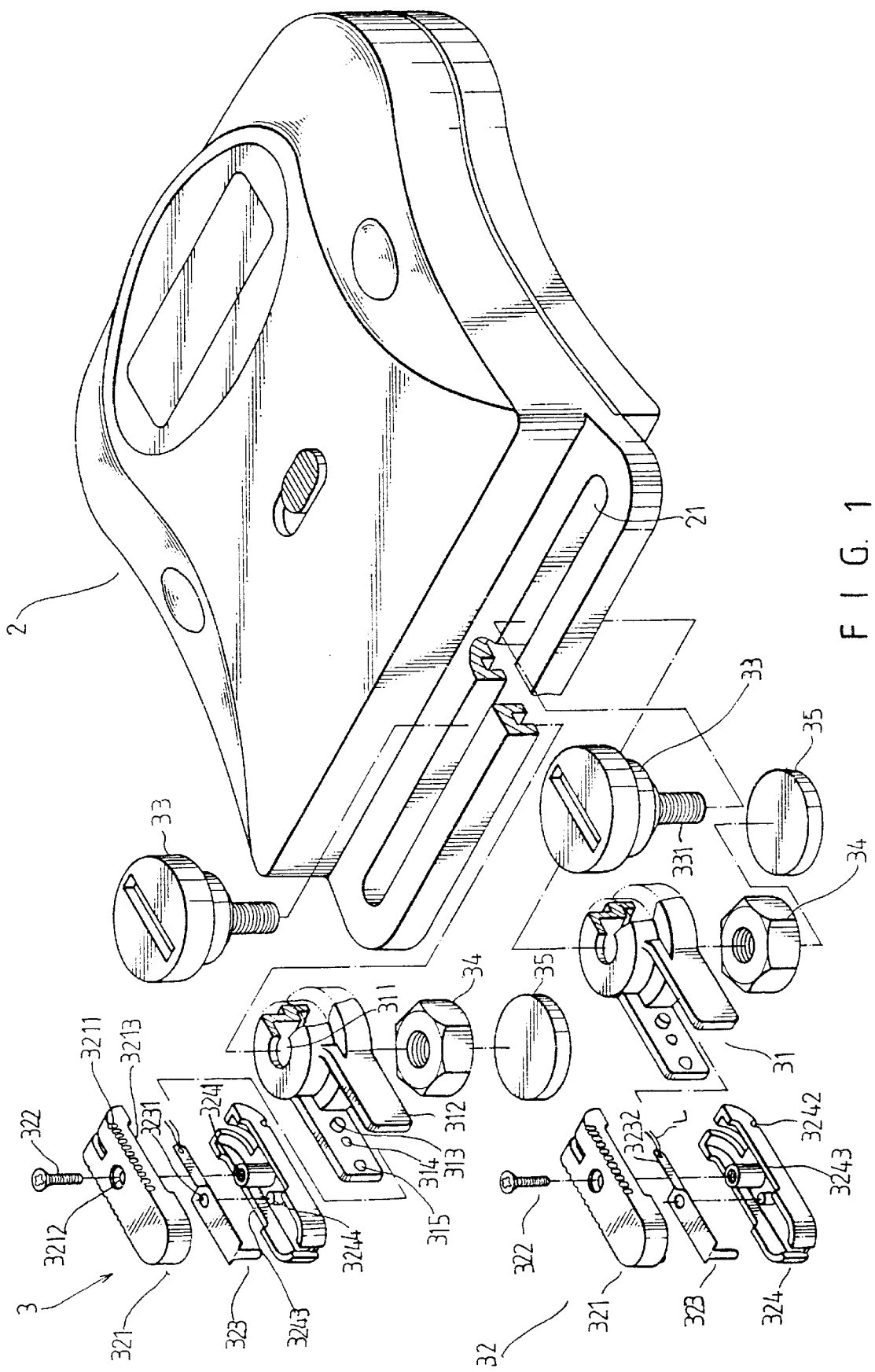
FIG. 1 is a perspective exploded view of a charger device of a preferred embodiment in accordance with the present invention.
Figure 2:
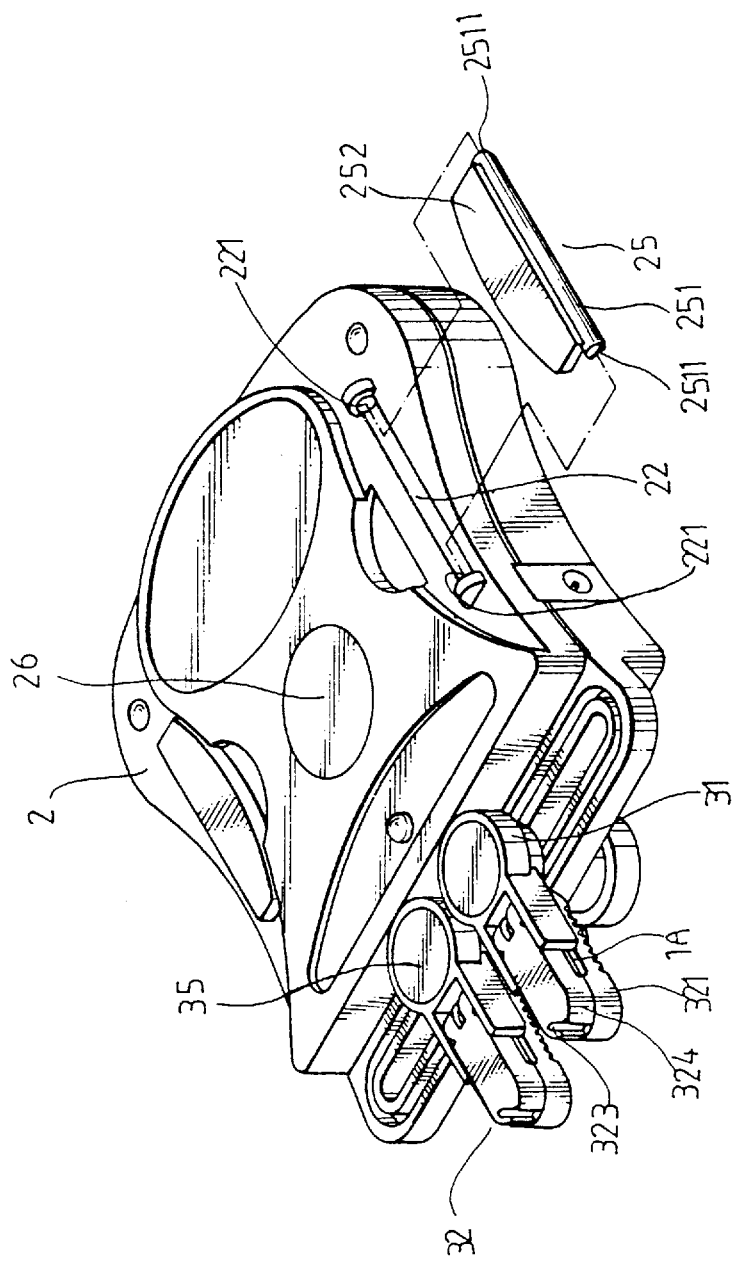
FIG. 2 is a bottom perspective assembly view of FIG. 1.
Figure 3:
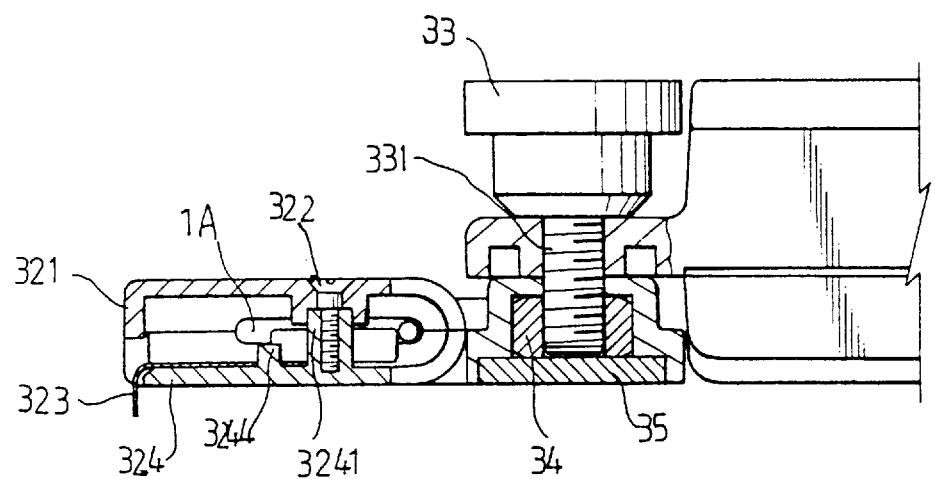
FIG. 3 is a partially sectional view of FIG. 2.

Referring to FIGS. 1 to 3, a charger device comprises a box 2, a first charger jib 3, and a second charger jib 3. The box 2 has a slot 21 formed on a front portion of the box 2, a channel recess 221 formed on a bottom of the box 2, and a magnet device 26 disposed on the bottom of the box 2. The first charger jib 3 has a first button 33, a first threaded rod 331 disposed on a bottom of the first button 33, and a first probe support device 32 connected to the first button 33. The first probe support device 32 has a first upper casing 321, a first lower casing 324 coupled with the first upper casing 321, a first probe bar 323 disposed between the first upper casing 321 and the first lower casing 324, a first adjusting seat 31 having a first round hole 311, and a first arm 312 and a second arm 312 clamping the first upper casing 321 and the first lower casing 324, a first nut 34 disposed on a bottom of the first adjusting seat 31, a first magnet disk 35 disposed on a bottom of the first nut 34, and the first threaded rod 331 passing through the slot 21, the first round hole 311, and the first nut 34. The first arm 312 has a first post 313, a first protrusion 314, and a first protuberance 315. The second arm 312 has a second post 313, a second protrusion 314, and a second protuberance 315. The first upper casing 321 has a first threaded hole 3212, two first lateral serrations 3211, and a first bottom groove 3213. The first lower casing 324 has a first bottom notch 3242, a first upper groove 3243, a first threaded cylinder seat 3241, and a first pillar 3244. A first oblong hole 1A is defined by the first bottom groove 3213 and the first upper groove 3243. The first probe bar 323 has a first circular hole 3231 and a first distal end 3232. The first pillar 3244 is inserted in the first circular hole 3231. A first wire 1L is connected to the first distal end 3232. The first protrusion 314 is inserted in the first bottom notch 3242. A positioning device 25 has a plate 252, a shaft 251 connected to the plate 252, and the shaft 251 having two ends 2511. The shaft 251 is inserted in the channel recess 221. The second charger jib 3 has a second button 33, a second threaded rod 331 disposed on a bottom of the second button 33, and a second probe support device 32 connected to the second button 33. The second probe support device 32 has a second upper casing 321, a second lower casing 324 coupled with the second upper casing 321, a second probe bar 323 disposed between the second upper casing 321 and the second lower casing 324, a second adjusting seat 31 having a second round hole 311, and a third arm 312 and a fourth arm 312 clamping the second upper casing 321 and the second lower casing 324, a second nut 34 disposed on a bottom of the second adjusting seat 31, a second magnet disk 35 disposed on a bottom of the second nut 34, and the second threaded rod 331 passing through the slot 21, the second round hole 311, and the second nut 34. The third arm 312 has a third post 313, a third protrusion 314, and a third protuberance 315. The fourth arm 312 has a fourth post 313, a fourth protrusion 314, and a fourth protuberance 315. The second upper casing 321 has a second threaded hole 3212, two second lateral serrations 3211, and a second bottom groove 3213. The second lower casing 324 has a second bottom notch 3242, a second upper groove 3243, a second threaded cylinder seat 3241, and a second pillar 3244. A second oblong hole 1A is defined by the second bottom groove 3213 and the second upper groove 3243. The second probe bar 323 has a second circular hole 3231 and a second distal end 3232. The second pillar 3244 is inserted in the second circular hole 3231. A second wire 1L is connected to the second distal end 3232. The second protrusion 314 is inserted in the second bottom notch 3242.

Figure 4:
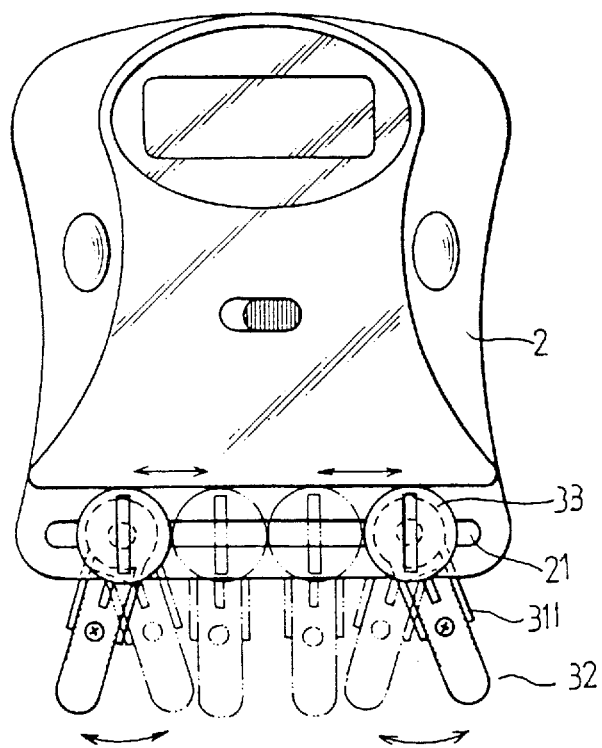
FIG. 4 is a first schematic view illustrating an operation of a charger device of a preferred embodiment in accordance with the present invention.

Referring to FIG. 4, the first button 33 and the second button 33 can be adjusted.

Referring to FIG. 5, the first probe support device 32 is rotated downward. The first protrusion 314 and the second protrusion 314 are engaged with the serrations 3211.

Referring to FIG. 6, the engagement between the first protrusion 314 and the respective serration 3211 is adjusted.

The engagement between the second protrusion 314 and the respective serration 3211 is adjusted.

Figure 7:
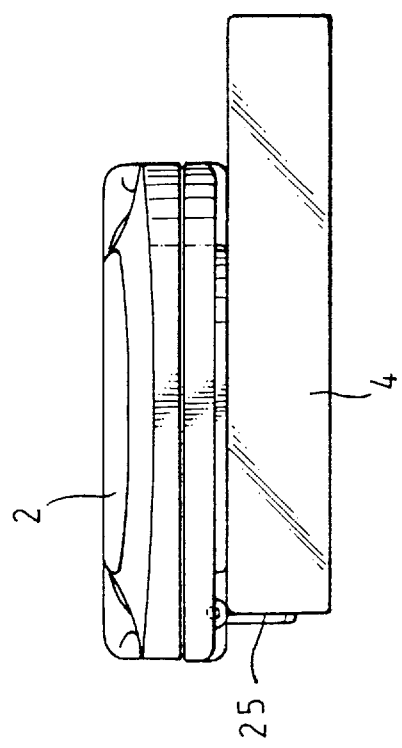
FIG. 7 is a first elevational view illustrating an application of a charger device of a preferred embodiment in accordance with the present invention.

Referring to FIG. 7, a first battery 4 is blocked by the positioning device 25.

Figure 8:
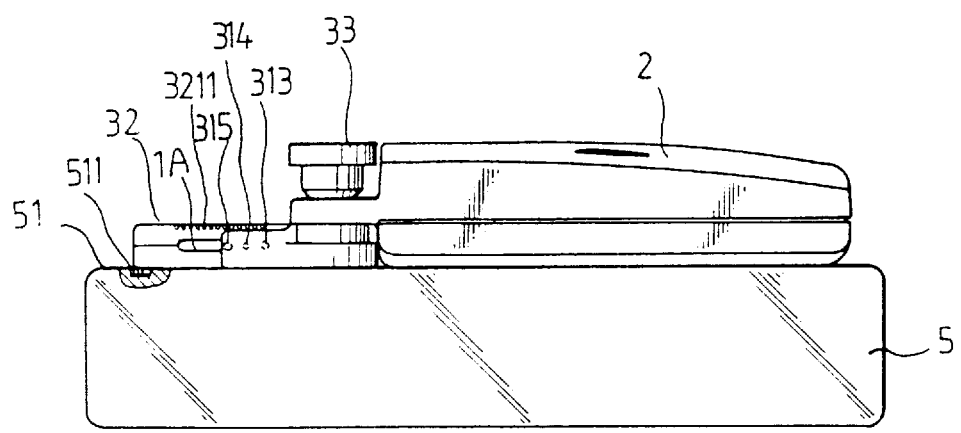
FIG. 8 is a second elevational view illustrating an application of a charger device of a preferred embodiment in accordance with the present invention.

Referring to FIG. 8, a second battery 5 has an upper portion 51 and a recess hole 511 formed on the upper portion 51. The upper portion 51 of the second battery 5 is placed on the bottom of the box 2. The first probe bar 323 is inserted in the recess hole 511.

Figure 9:
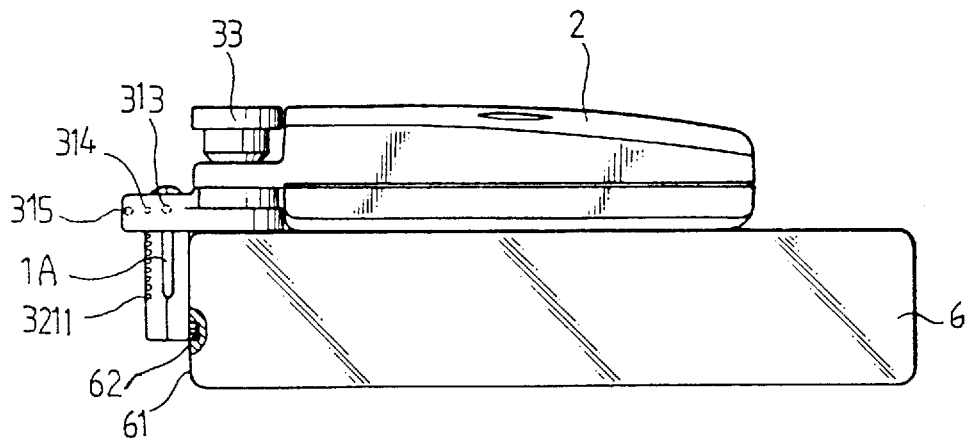
FIG. 9 is a third elevational view illustrating an application of a charger device of a preferred embodiment in accordance with the present invention.

Referring to FIG. 9, a third battery 6 has a lateral 61 and a recess hole 62 formed on the lateral 61. The first probe support device 32 is rotated downward. The first probe bar 323 is inserted in the recess hole 62.

Figure 10:
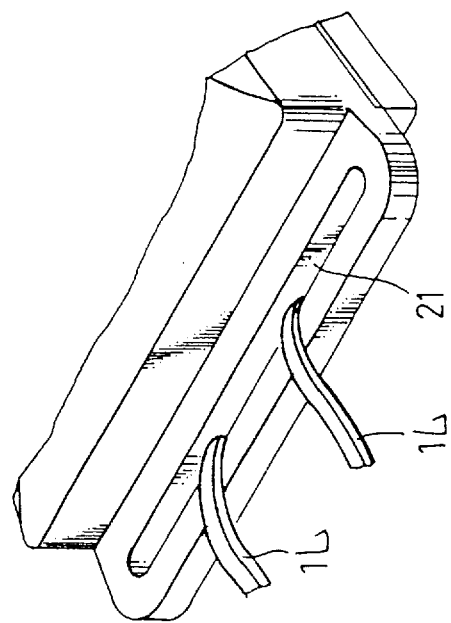
FIG. 10 is a partially perspective view illustrating an application of a charger device of a preferred embodiment in accordance with the present invention.
Figure 10:
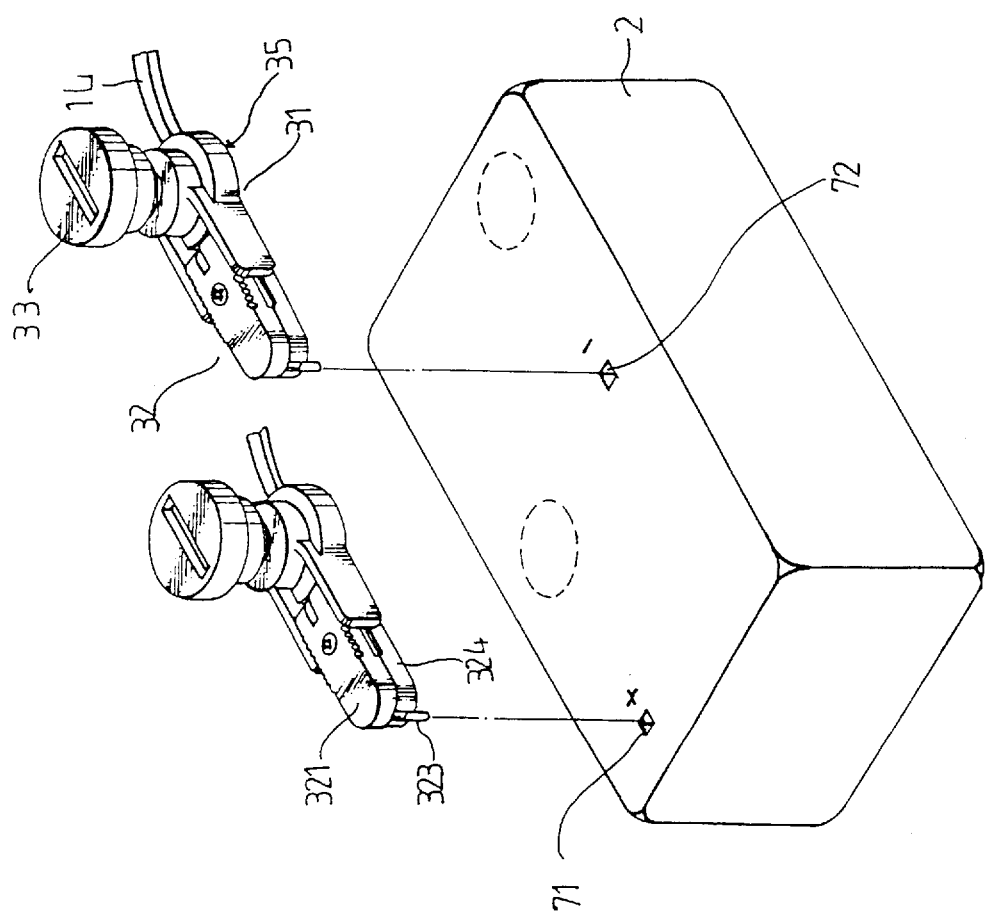

Referring to FIG. 10, a fourth battery 7 has a first recess hole 71 and a second recess hole 72. The first recess hole 71 is not parallel to the second recess hole 72. The first and the second probe support devices 32 can be adjusted to match the first recess hole 71 and the second recess hole 72.

The invention is not limited to the above embodiment but various modification thereof may be made. Further, various changes in form and detail may be made without departing from the scope of the invention.

I claim:

1. A charger device comprises:

a box and two charger jibs, said box having a slot formed on a front portion of the box, a channel recess formed on a bottom of said box, and a magnet device disposed on the bottom of said box, each said charger jib having a button, a threaded rod disposed on a bottom of the button, and a probe support device connected to the button, the probe support device having an upper casing, a lower casing coupled with the upper casing, a probe bar disposed between the upper casing and the lower casing, an adjusting seat having a round hole, and two arms clamping the upper casing and the lower casing, a nut disposed on a bottom of the adjusting seat, a magnet disk disposed on a bottom of the nut, and the threaded rod passing through the slot, the round hole, and the nut.

2. A charger device as claimed in claim 1, further comprising a positioning device having a plate, and a shaft connected to the plate, with the shaft being inserted in the channel recess.

3. A charger device as claimed in claim 1, wherein each of said two arms has a post, a protrusion, and a protuberance.

4. A charger device as claimed in claim 1, wherein the upper casing has a threaded hole, two lateral serrations, and a bottom groove.

5. A charger device as claimed in claim 1, wherein the lower casing has a bottom notch, an upper groove, a threaded cylinder seat, and a pillar.

\* \* \* \* \*